(12) United States Patent
Harz et al.

(10) Patent No.: US 10,110,658 B2
(45) Date of Patent: *Oct. 23, 2018

(54) AUTOMATIC GENRE CLASSIFICATION DETERMINATION OF WEB CONTENT TO WHICH THE WEB CONTENT BELONGS TOGETHER WITH A CORRESPONDING GENRE PROBABILITY

(71) Applicant: International Business Machines Corporation, Armonk, NY (US)

(72) Inventors: Dirk Harz, Kassel (DE); Ralf Iffert, Kassel (DE); Mark Keinhoerster, Dusseldorf (DE); Mark Usher, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 697 days.

This patent is subject to a terminal disclaimer.

(21) Appl. No.: 14/729,454

(22) Filed: Jun. 3, 2015

(65) Prior Publication Data

US 2015/0264107 A1 Sep. 17, 2015

Related U.S. Application Data

(63) Continuation of application No. 14/096,481, filed on Dec. 4, 2013, now Pat. No. 9,565,236.

(30) Foreign Application Priority Data

Jan. 15, 2013 (GB) .................................. 1300685.3

(51) Int. Cl.
*H04L 29/08* (2006.01)
*G06N 99/00* (2010.01)

(52) U.S. Cl.
CPC ........... *H04L 67/02* (2013.01); *G06N 99/005* (2013.01)

(58) Field of Classification Search
None
See application file for complete search history.

(56) References Cited

U.S. PATENT DOCUMENTS 6,973,423 B1 12/2005 Nunberg et al.
7,565,350 B2 7/2009 Fetterly et al.
(Continued)

OTHER PUBLICATIONS

Chaker, Jebari et al., "Genre categorization of web pages", IEEE, IEEE Computer Society, Seventh IEEE International Conference on Data Mining Workshops (ICDMW 2007), Oct. 28, 2007, pp. 455-464.

(Continued)

*Primary Examiner* — Robert A Cassity
*Assistant Examiner* — Robert Bejcek, II
(74) *Attorney, Agent, or Firm* — Francis Lammes; Stephen J. Walder, Jr.; Jeffrey S. LaBaw

(57) ABSTRACT

A mechanism is provided for automatic genre determination of web content. For each type of web content genre, a set of relevant feature types are extracted from collected training material, where genre features and non-genre features are represented by tokens and an integer counts represents a frequency of appearance of the token in both a first type of training material and a second type of training material. In a classification process, fixed length tokens are extracted for relevant features types from different text and structural elements of web content. For each relevant feature type, a corresponding feature probability is calculated. The feature probabilities are combined to an overall genre probability that the web content belongs to a specific trained web content genre. A genre classification result is then output comprising at least one specific trained web content genre to which the web content belongs together with a corresponding genre probability.

7 Claims, 6 Drawing Sheets

(56) References Cited

U.S. PATENT DOCUMENTS

| | | |
|---|---|---|
| 8,005,810 B2 | 8/2011 | Naam et al. |
| 8,073,947 B1 | 12/2011 | Yeh et al. |
| 2006/0031318 A1 | 2/2006 | Gellens |
| 2008/0086555 A1 | 4/2008 | Feinleib |
| 2010/0312769 A1 | 12/2010 | Bailey et al. |

OTHER PUBLICATIONS

Graham, Paul, "Practical: A Spam Filter", O'Reilly Media, Hackers & Painters: Big Ideas from the Computer Age, Chapter 23, May 25, 2004, pp. 291-309.

Gupta, Suhit et al., "DOM-based Content Extraction of HTML Documents", ACM, WWW2003, Budapest, Hungary, May 20-24, 2003, pp. 207-214.

Gustavsson, Jonas, "Text Categorization Using Acquaintance", Stockholm University, English Department, English Linguistics, 60 p term paper, http://plaza.ufl.edu/jgu/public_html/C-uppsats/cup.html, Jun. 3, 1996, 12 pages.

Pantel, Patrick et al., "SpamCop: A Spam Classification & Organization Program", AAAI, AAAI Technical Report WS-98-05, (month unknown) 1998, pp. 95-98.

Roy, Pinki et al., "A New Approach Towards Text Filtering", IEEE, IEEE Computer Society, 2009 Second International Conference on Computer and Electrical Engineering, vol. 2, Dec. 28, 2009, pp. 205-208.

Yang, Yiming et al., "A Study of Approaches to Hypertext Categorization", Kluwer Academic Publishers, Journal of Intelligent Information Systems, vol. 18, No. 2-3, Mar. 1, 2002, pp. 219-241.

Report under Section 17(5)(b), Application No. GB1300685.3 dated Jul. 18, 2013, 5 pages.

U.S. Appl. No. 14/096,481, 2 pages.

Garcia, Renato D. et al., "Improving Topic Exploration in the Blogosphere by Detecting Relevant Segments", Proceedings of I-KNOW'09 and I-SEMANTICS'09, Graz, Austria, Sep. 2-4, 2009, pp. 177-188.

Graham, Paul, "A Plan for Spam", http://www.paulgraham.com/spam.html, Aug. 2002, retrieved Oct. 8, 2013, 12 pages.

Noll, Michael G. et al., "Web Page Classification: An Exploratory Study of the Usage of Internet Content Rating Systems", HACK 2005, Luxembourg City, Luxembourg, http://www.michael-noll.com/blog/uploads/Michael-Noll_Usage-of-Internet-Content-Rating-Systems_2005-v1.1.pdf, 2005, 6 pages.

Rehm, Georg, "Towards Automatic Web Genre Identification a Corpus-Based Approach in the Domain of Academia by Example of the Academic's Personal Homepage", IEEE, Proceedings of the Hawaii International Conference on System Sciences, Big Island, Hawaii, Jan. 7-10, 2002, 10 pages.

Robinson, Gary, "A Statistical Approach to the Spam Problem", http://www.linuxjournal.com/article/6467, Mar. 1, 2003, retrieved Oct. 8, 2013, 7 pages.

Scholl, Philipp et al., "Towards Language-Independent Web Genre Detection", WWW 2009, Madrid, Spain, Apr. 20-24, 2009, pp. 1157-1158.

AUTOMATIC GENRE CLASSIFICATION DETERMINATION OF WEB CONTENT TO WHICH THE WEB CONTENT BELONGS TOGETHER WITH A CORRESPONDING GENRE PROBABILITY

BACKGROUND

The present invention relates in general to the field of internet communication, and in particular to a method and a system for automatic genre determination of web content. Still more particularly, the present invention relates to a data processing program and a computer program product for automatic genre determination of web content.

The internet contains a huge number of web pages, and is growing at an astonishing rate. It is not uncommon for 150,000 new domains to be registered under a generic top level domain (TLD) in a single day. Search engines crawl the internet, and attempt to index and classify these web pages. Web page classification is generally based on content classification. Simply stated, the textual content is extracted from the web page and analyzed for the occurrence of words and phrases indicative of a content genre. For example, to ascertain whether a web page contains content regarded as illicit, the text content could be compared against a list of known illicit keywords. If the text contains sufficiently many illicit keywords, then it is regarded as being illicit in content. The keywords used to classify content can also be ascertained automatically in a so-called "supervised learning" environment, where corpora of content relating to genre and not-genre are presented to a learning algorithm, which then selects the statistically significant keywords for the given genre.

Keywords for a genre must not even be complete words. Using a technique known as "shingling" (or n-gram analysis), a "sliding window" of N-characters is passed over the text, and a token of length N is extracted from each window position in the text. The window is typically shifted by a single character. The computing resources required for n-gram analysis are typically higher than that required for traditional keyword extraction, as there are far more possibilities for token values. The technique is more robust, however, as it (for example) automatically takes into account word stems.

An increasing proportion of web content is, however, not reliably classifiable via the text content. This is because the text itself does not relate to one particular genre, but rather, contains a wide range of different topics and contexts. An example of such web content is a "web log" page, often referred to as a "blog". If the blog author limits his writings to a single topic, for example ornithology, then the content may be assigned by automatic classification to a general category, e.g. "nature" or "birds". If the blog author writes about current affairs, for example, or has many different topics which interest him, then the content will not be reliably classifiable.

The real problem, however, is that the "true" genre of the web page is "blog", and this genre can never be ascertained from the textual content of the web page. Blogs are only one example of a "meta" genre which is not classifiable via its content. Other examples are forums, chat rooms, social media sites, internet discussion sites and so forth. In general, all sites which act as a container for user generated content fall into this genre.

The requirement for search engines to identify blog pages is current. For example, to include or exclude blog or social media content from search engine queries, the content, and therefore the web page, must first be labeled as belonging to such a genre.

In another scenario, a next-generation firewall product (NGFW) may wish to restrict access to, for example, chat rooms and social media sites. The ability to identify such web page genres in a "live" environment, or via a database of known URLs, would be very valuable.

Whilst there are many classification schemes for traditional web content, there are relatively few proposals to solve the problem of meta genres.

In the Patent Application Publication U.S. Pat. No. 7,565, 350 B2 "IDENTIFYING A WEB PAGE AS BELONGING TO A BLOG" a method to identify blog pages is disclosed. The disclosed method is restricted to blog pages, and could not be used to identify the other "meta" genres mentioned previously.

SUMMARY

In one embodiment, a method in a data processing system, is provided for automatic genre determination of web content. In a training process, for each type of web content genre to be trained the training process, the illustrative embodiment comprises the steps of: collecting labeled example data representing a first type of training material reflecting the type of web content genre to be trained; collecting labeled example data representing a second type of training material not reflecting the type of web content genre to be trained; extracting a set of relevant feature types comprising genre features and non-genre features from the collected first and second type of training material, wherein the genre features and the non-genre features are represented by tokens consisting of fixed length character strings extracted from content strings of the first and second type of training material; and storing each token in a corresponding feature database together with a first integer count representing a frequency of appearance of the token in the first type of training material and a second integer count representing a frequency of appearance of the token in the second type of training material. In a classification process, the illustrative embodiment comprises the steps of: providing web content; extracting fixed length tokens for relevant features types from different text and structural elements of the web content; looking up frequencies of appearance in the corresponding feature database for each extracted token; calculating for each relevant feature type a corresponding feature probability that the web content belongs to a corresponding specific trained web content genre by combining probabilities of the genre features and non-genre features; combining the feature probabilities to an overall genre probability that the web content belongs to a specific trained web content genre; and outputting a genre classification result comprising at least one specific trained web content genre to which the web content belongs together with a corresponding genre probability.

In other illustrative embodiments, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In yet another illustrative embodiment, a computer program product comprising a computer useable or readable medium having a computer readable program is provided.

The computer readable program, when executed on a computing device, causes the computing device to perform various ones of, and combinations of, the operations outlined above with regard to the method illustrative embodiment.

The above, as well as additional purposes, features, and advantages of the present invention will become apparent in the following detailed written description.

BRIEF DESCRIPTION OF THE DRAWINGS

A preferred embodiment of the present invention, as described in detail below, is shown in the drawings, in which.

DETAILED DESCRIPTION

Figure 1:
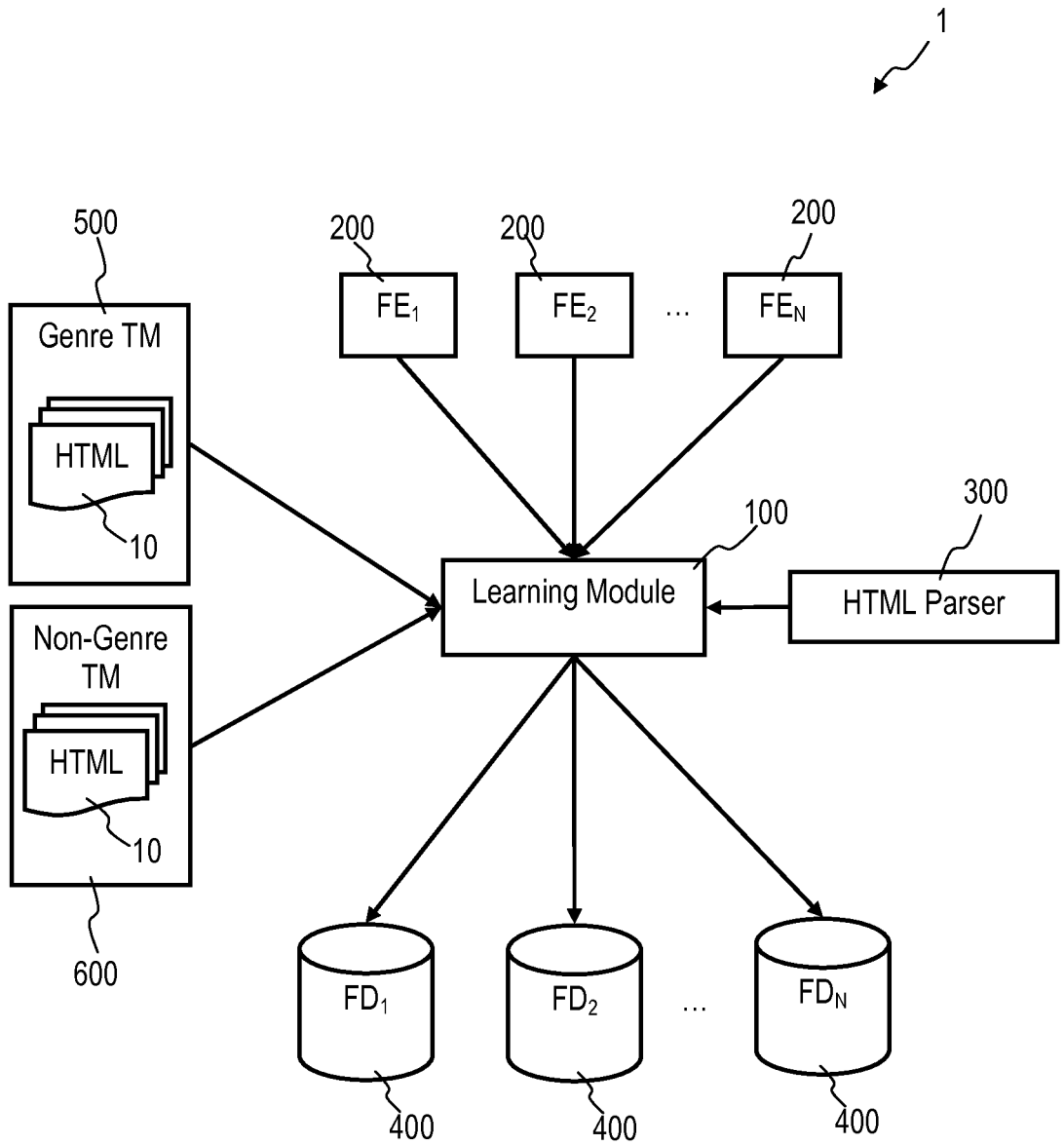
FIG. 1 is a schematic block diagram of a training functionality configured to work in a system for automatic genre determination of web content, in accordance with an embodiment of the present invention.

All in all, embodiments of the present invention are focused on a method for automatic genre determination of web content where the "meta" genre of web content can be determined by analysis of the content and the non-content structure of the web page.

The learning functionality performs a training process of the genre classifier for a particular "meta" genre of a web page by creating a set of genre feature databases. The learning functionality takes as input corpora of genre and not-genre HTML code, for example, and extracts from the HTML code of each corpus features of a first type denoting N-gram features from the meta data contained therein, a second type denoting N-gram features from the uniform resource locator (URL) data contained therein, and a third type denoting non-content structural features of the data, or a subset of these types. The features are extracted from the HTML code using one or more feature extractors, at least one feature extractor per feature type. The extracted features from the feature types which are considered significant to the reliable identification of the meta genre based on the input corpora are saved to a feature database, together with genre and not-genre occurrence frequencies of each feature, wherein at least one database is created for each feature type.

The classification functionality consists of at least one genre-classifier. Each genre classifier consists of at least one feature classifier, and a parameter set containing genre-specific control variables. Each feature classifier contains a feature extractor.

The classification functionality performs a classification of a given HTML code passing the HTML code to each genre classifier. The genre classifier passes the HTML code to each feature classifier, which in turn extracts features using its feature extractor, and performs a feature classification by comparing these features with the features contained in its feature database, and computing a probability that the HTML code belongs to the genre of the genre classifier. The genre classifier combines the results of the feature classifiers using a specified combination function and computes an overall probability that the HTML code belongs to the genre of the genre classifier. The classification module in turn combines the results of the genre classifiers, and returns an overall classification result containing the genre or genres to which the HTML code belongs.

This solution differs from the above named prior art, in that the important features are learnt from the training corpora, and that non-content structural features are used in the training and classification. These two aspects make the solution far more flexible, and able to categorize many different meta genres of web pages.

The classification functionality could be used in many situations, for example in conjunction with a web crawler and URL database to store genre classifications for URLs, which in turn could be used in a next-generation firewall (NGFW) product, to block or allow access to specific web genres, or in a search engine to include or exclude specific search results based on genre. Such a search engine can refine search results based on the web genres which are determined by the inventive concept of this invention.

Embodiments of the present method for automatic genre determination of web content are divided into the training process for generating the feature database, wherein for each feature type an own database exists; and the classification process for classifying the HTML web page into specific web page genres or web categories by using the features from the feature database and calculating an overall probability of a web page belonging to a trained web genre or web category.

The corresponding system for automatic genre determination of web content comprises the learning functionality and the classification functionality. The learning functionality automatically extracts relevant genre features from labeled example data, and saves these to the feature database. The classification functionality extracts features from an unknown web page, and performs a genre classification based on the feature databases. A score between 0 and 1 is returned for each genre, for example. The sensitivity of the system can be adjusted via tuning parameters and search options.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
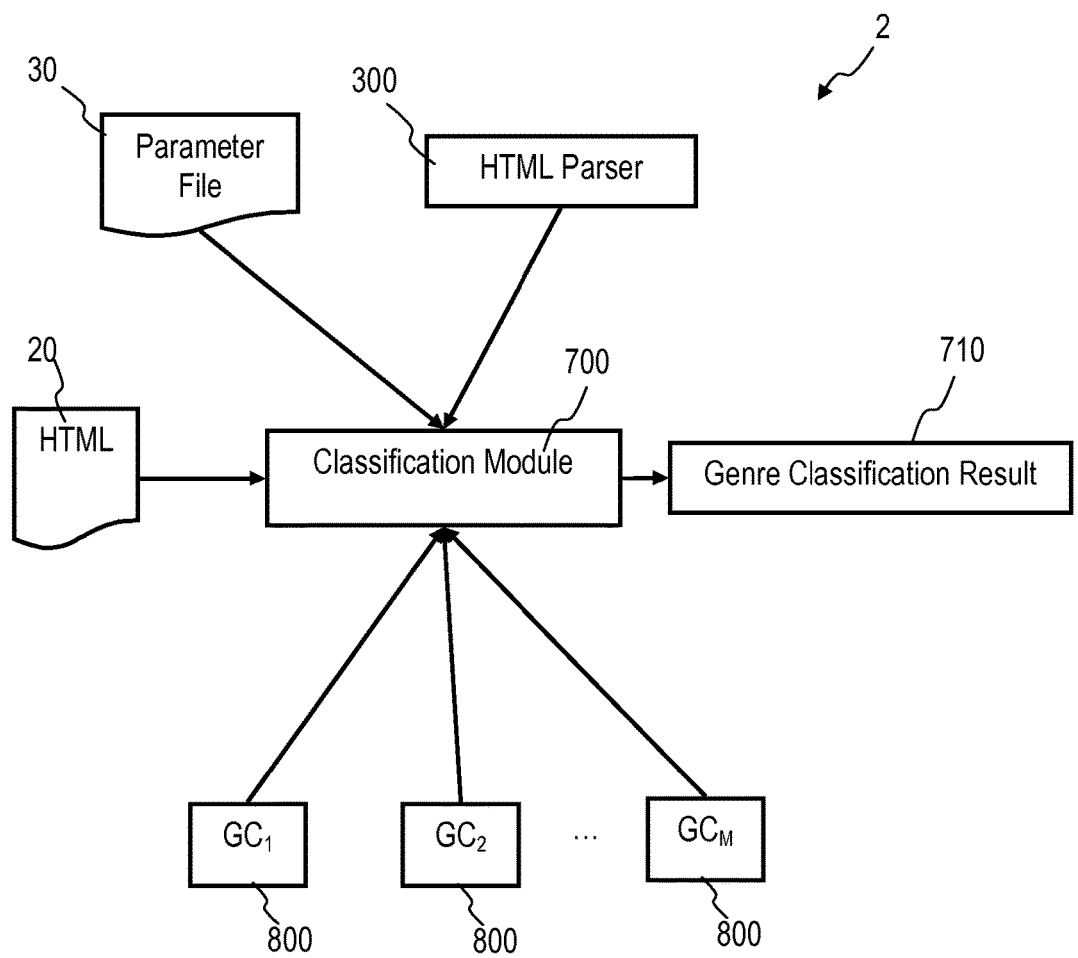
FIG. 2 is a schematic block diagram of a classification functionality configured to work in a system for automatic genre determination of web content, in accordance with an embodiment of the present invention.
Figure 3:
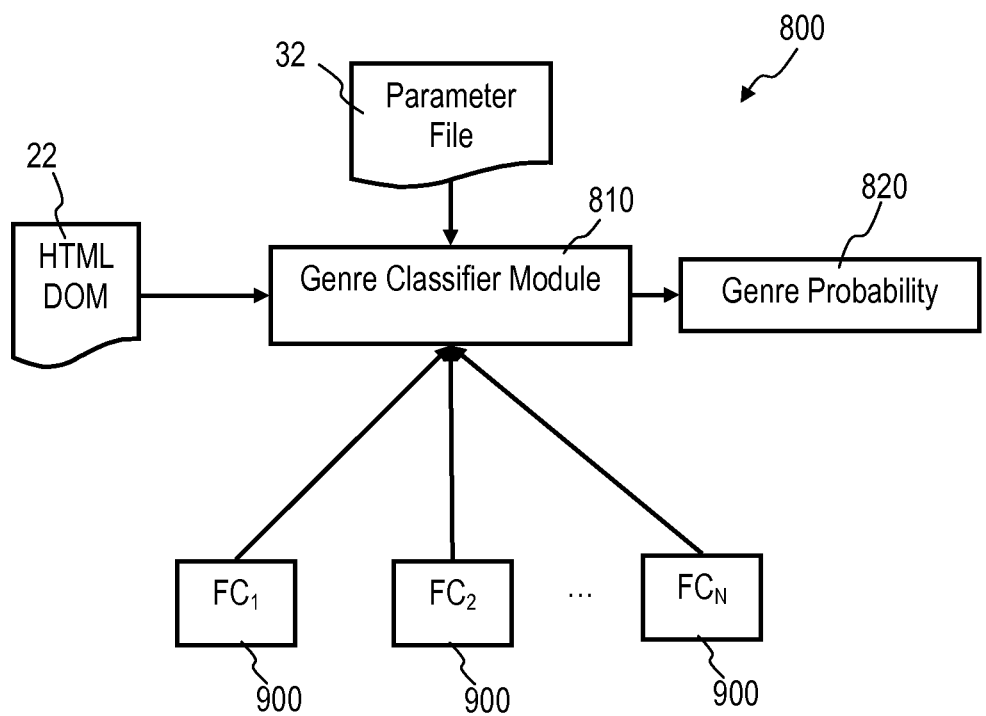
FIG. 3 is a schematic block diagram of a genre classifier for the classification functionality shown in FIG. 2, in accordance with an embodiment of the present invention.
Figure 4:
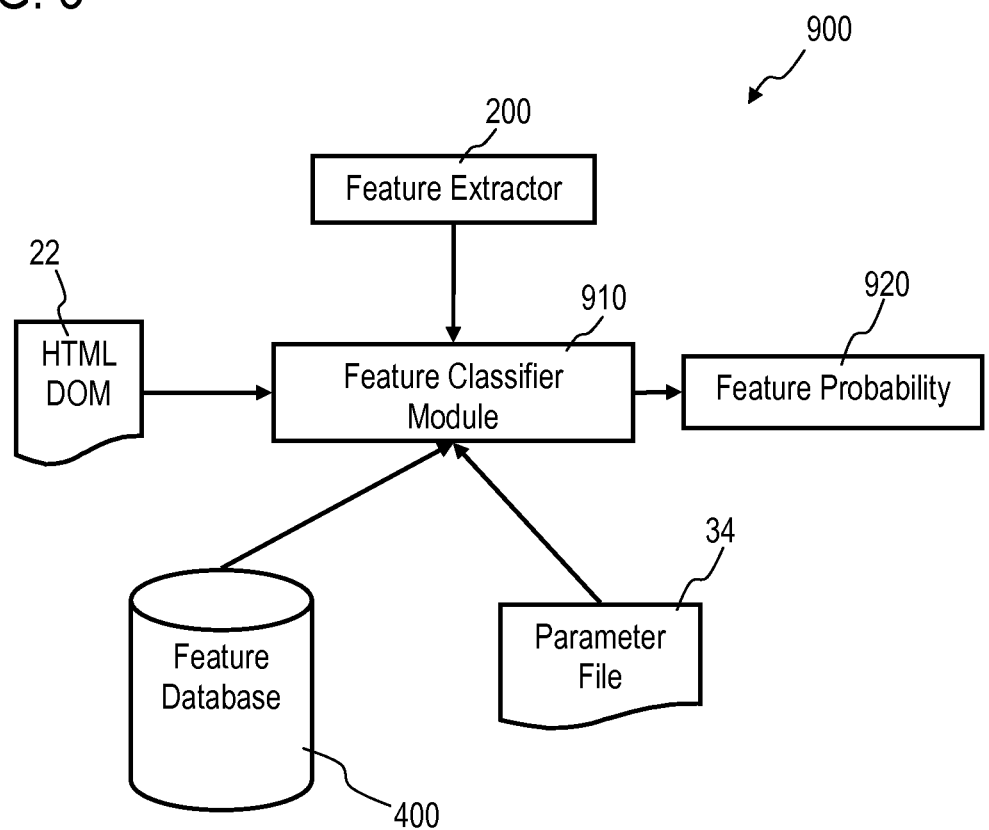
FIG. 4 is a schematic block diagram of a feature classifier for the genre classifier shown in FIG. 3, in accordance with an embodiment of the present invention.
Figure 5:
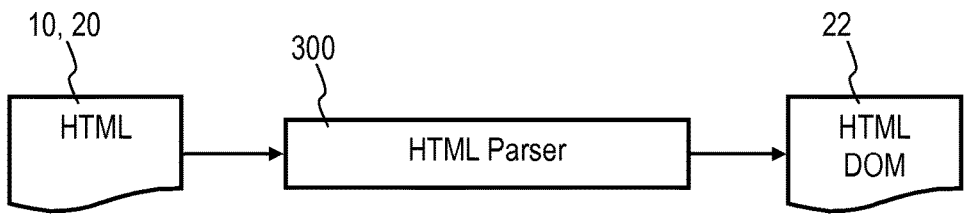
FIG. 5 is a schematic block diagram of conversion of HTML data to HTML-DOM data used in the genre classifier of FIG. 3 and in the feature classifier shown in FIG. 4, in accordance with an embodiment of the present invention.
Figure 6:
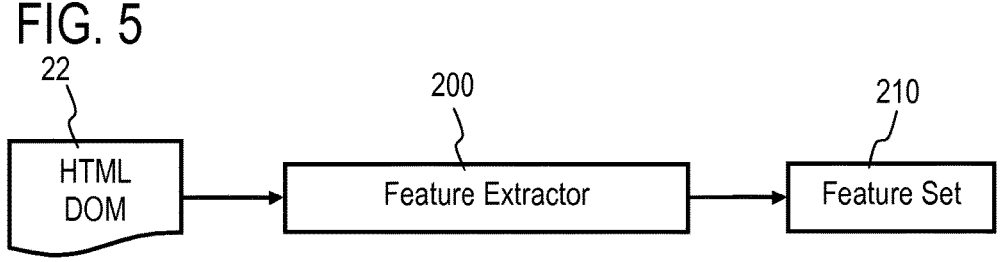
FIG. 6 is a schematic block diagram of a feature extractor for the feature classifier shown in FIG. 4, and the training functionality 1 shown in FIG. 1, in accordance with an embodiment of the present invention.

FIG. 1 shows a training functionality 1 configured to work in a system for automatic genre determination of web content, in accordance with an embodiment of the present invention; FIG. 2 shows a classification functionality 2 configured to work in a system for automatic genre determination of web content, in accordance with an embodiment of the present invention; FIG. 3 shows a genre classifier 800 for the classification functionality 2 shown in FIG. 2, in accordance with an embodiment of the present invention; FIG. 4 shows a feature classifier 900 for the genre classifier 800 shown in FIG. 3, in accordance with an embodiment of the present invention; FIG. 5 shows the conversion of HTML data to HTML-DOM data used in the genre classifier 800 of FIG. 3, and in the feature classifier 900 shown in FIG. 4, in accordance with an embodiment of the present invention; and FIG. 6 shows a feature extractor 200 for the feature classifier 900 shown in FIG. 4, and the training functionality 1 shown in FIG. 1, in accordance with an embodiment of the present invention.

Referring to FIGS. 1 to 6, the shown embodiment of the present invention employs a system for automatic genre determination of web content 20 comprising a training functionality 1 and classification functionality 2.

The training functionality 1 comprises a learning module 100, and at least one feature extractor 200, wherein FIG. 1 shows exemplary a first feature extractor $FE_1$, a second feature extractor $FE_2$ and an n-th feature extractor $FE_N$. For each type of web content genre to be trained labeled example data 10 representing a first type of training material 500 reflecting the type of web content genre to be trained, and labeled example data 10 representing a second type of training material 600 not reflecting the type of web content genre to be trained is input into the learning module 100. The learning module 100 creates for each feature extractor 200 an initially empty feature database 400, wherein FIG. 1 shows exemplary a first feature database $FD_1$, a second feature database $FD_2$ and an n-th feature database $FD_N$. Each feature extractor 200 extracts a set of relevant feature types 210 comprising genre features and non-genre features from the collected first and second type of training material 500, 600, wherein the genre features and the non-genre features are represented by tokens 52, 54, shown in FIGS. 7 and 8, consisting of fixed length character strings extracted from content strings 40 of the first and second type of training material 500, 600. The learning module 100 adds each token 52, 54 in a corresponding feature database 400 together with a first integer count $C_G$ representing a frequency of appearance of the token 52, 54 in the first type training material 500 and a second integer count $C_{NG}$ representing a frequency of appearance of the token 52, 54 in the second type training material 600.

The classification functionality 2 comprises a classification module 700 and at least one genre classifier 800 wherein FIG. 2 shows exemplary a first genre classifier $GC_1$, a second genre classifier $GC_2$ and an m-th genre classifier $GC_M$. Each genre classifier 800 comprises at least one feature classifier 900, wherein FIG. 3 shows exemplary a first feature classifier $FC_1$, a second feature classifier $FC_2$ and an n-th feature classifier $FC_N$. Each feature classifier 900 comprises a feature extractor 200. The classification module 700 performs a classification of a given web content 20 by passing the web content 20 to each genre classifier 800. Each genre classifier 800 passes the web content 20 to each feature classifier 900, which in turn extracts fixed length tokens 52, 54 from different text and structural elements of a provided web content 20 representing genre features and non-genre features for relevant genre features types using its feature extractor 200, and performs a feature classification by comparing these features with the features contained in its feature database 400, and computing a feature probability 920 that the web content 20 belongs to the specific trained web content genre of the genre classifier 800. Each genre classifier 800 combines feature probabilities 920 of the feature classifiers 900 using a specified combination function and computes an overall genre probability that the web content 20 belongs to the specific trained web content genre of the genre classifier 800. The classification module 700 combines genre probabilities 820 of the genre classifiers 800 to a genre classification result 710, and outputs an overall classification result comprising at least one specific trained web content genre to which the web content 20 belongs together with a corresponding genre probability 820.

As stated above the system for automatic genre determination of web content 20 comprises the learning module 100, the classification module 700, one or more genre classifiers 800, one or more feature classifiers 900, one or more feature extractors 200, and one or more feature databases 400.

For simplification of the description, in the following web content is represented by HTML data. So, HTML text data 10, 20 is used as initial input to the learning module 100 and the classification module 700.

Referring to FIG. 5, the HTML data 10, 20 is parsed using a HTML-DOM parser 300, for example, and an HTML-DOM object 22 is generated, which is a tree representation of the HTML document 10, 20, where every HTML tag, attribute and text data of the document is represented as a node in the tree. The tree structure can be efficiently traversed and searched to extract different text and structural elements of the HTML document 10, 20. Genre classifiers 800, feature classifiers 900 and feature extractors 200 use this HTML-DOM data representation 22 to perform feature extraction and analysis.

Referring to FIGS. 1, 4, 7 and 8, each feature database 400 consists of a set of tokens 50, 50', a token 52, 54 consisting of a fixed length string of characters in the range 0-255, for example, representing a feature. For each token 52, 54 in the database 400 the first integer count $C_G$ representing the number of times the feature has been found in the first (genre) training material 500 of training documents 10, and the second integer count $C_{NG}$ representing the number of times the feature has been found in the second (non-genre) training material 600 of training documents 10 are stored. The tokens 52, 54 are stored in alphabetic order in the database 400, to enable a binary search token lookup.

Figure 7:
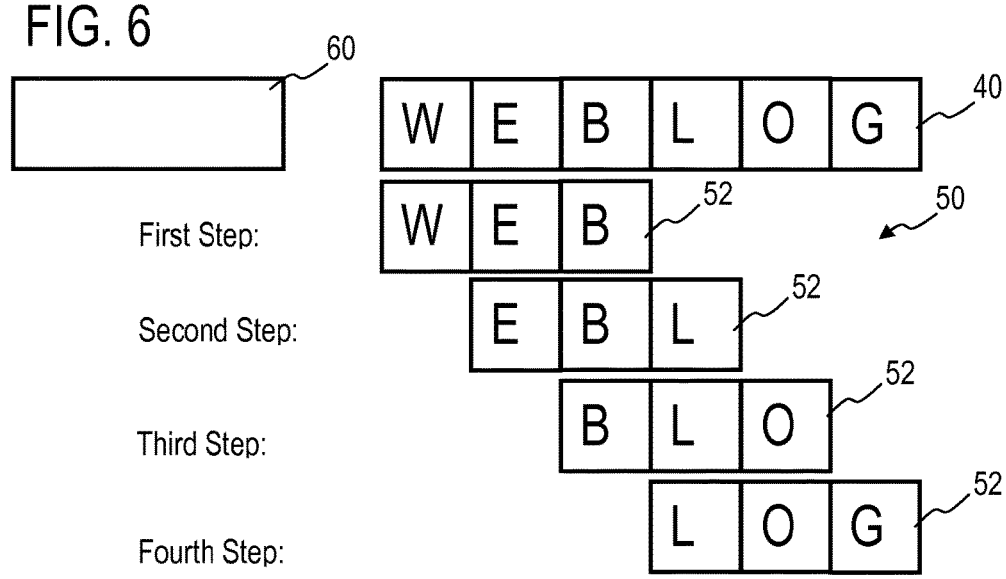
FIG. 7 is a schematic diagram of a first embodiment of a shingling method using a Trigram for the feature extractor of FIG. 6, in accordance with an embodiment of the present invention.
Figure 8:
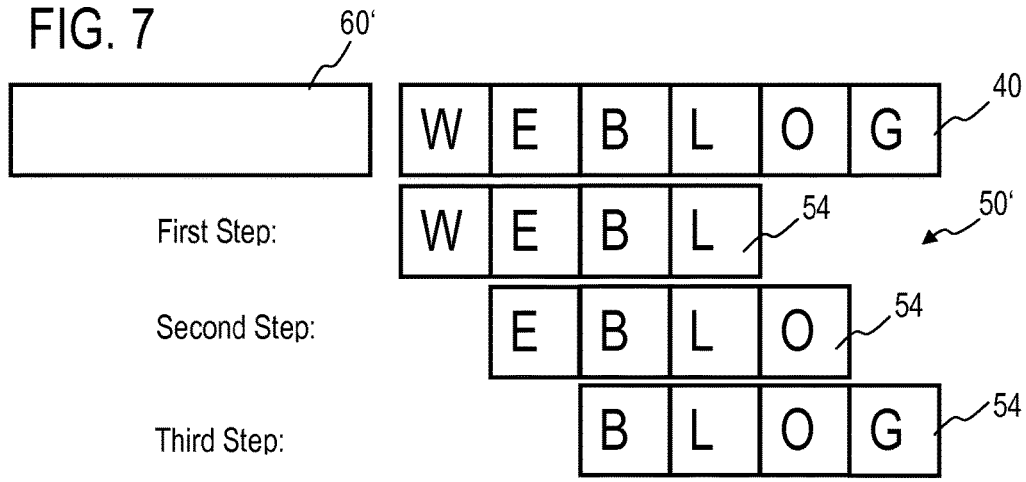
FIG. 8 is a schematic diagram of a second embodiment of a shingling method using a Tetragram for the feature extractor of FIG. 6, in accordance with an embodiment of the present invention.

Each database 400 stores additionally a third count $T_G$ representing a total number of documents in the first (genre) training material 500 of training documents 10, a fourth count $T_{NG}$, representing the total number of documents in the second (non-genre) training material 600 of training documents 10, and $T_L$, representing the fixed token length. Referring to FIG. 7, the fixed token length $T_L$ is three in the shown embodiment. Referring to FIG. 8, the fixed token length $T_L$ is four in the shown embodiment.

When a feature database 400 is loaded into main memory, an additional value $P_F$ is calculated and stored with each feature. For a given feature, $Q_F$ represents the probability that a randomly chosen document which contains the feature belongs to the same genre as the first (genre) training material 500 of training documents 10. $P_F$ is calculated from $Q_F$, with additional parameters to take into account rare tokens. The value of $P_F$ for each feature is defined as according to equations (1) to (4).

$$g = C_G/T_G \quad (1)$$

$$ng = V_{BIAS} * C_{NG}/T_{NG} \quad (2)$$

$$Q_F = g/(g+ng) \quad (3)$$

$$P_F = (W_D * P_D + (C_G + C_{NG}) * Q_F) / [W_D + (C_G + C_{NG})] \quad (4)$$

Where $P_D$ represents a default probability for a feature not found in the first (genre) training material 500 or the second (non-genre) training material 600, $W_D$ represents a weight modifier for $P_D$, and $V_{BIAS}$ represents a weighting factor for non-genre tokens. The values of $P_D$, $W_D$ and $V_{BIAS}$ are not stored in the database 400, but are provided externally to the database 400 from the component which loads the database 400, a corresponding feature classifier 900, for example.

Referring to FIGS. 7 and 8, for a given sequence of characters 40 in the range 0-255, for example, a set of tokens 50, 50' is extracted from the character sequence 40 by passing a sliding window 60, 60' with a size of N characters over the sequence of characters 40 and forming a token 52, 54 from the characters which lie within the window 60, 60', starting from the left-most character "W". In FIG. 7 the sliding window 60 has a size of N=3 characters, and in FIG. 8 the sliding window 60' has a size of N=4 characters. The window 60, 60' is shifted by one character to the right until the end of the window 60, 60' lies at the last (right-most) character in the sequence of characters 40. If the same token occurs more than once in the sequence, it is only added once to the set of tokens 50, 50'.

For the exemplary given character sequence "WEBLOG" and N=3, shown in FIG. 7, the following tokens 52 are extracted: In a first step "WEB", in a second step "EBL", in a third step "BLO", and in a fourth step "LOG". For the exemplary given character sequence "WEBLOG" and N=4, shown in FIG. 8, the following tokens 52 are extracted: In a first step "WEBL", in a second step "EBLO", and in a third step "BLOG".

The sample principle applies when the data is not text data. The byte sequence "12 6A 3B 9C 4D 13 67", represented here as seven hexadecimal values, would be shingled to form the following tokens for N=5: "12 6A 3B 9C 4D", "6A 3B 9C 4D 13" and "3B 9C 4D 13 67" (the spaces between the values are included for clarity, and do not form part of the sequence or tokens).

Referring to FIG. 6, the feature extractor 200 takes as input HTML-DOM data 22 and extracts a set 210 of tokens or features from the data. Different tokens are extracted from the documents depending on the type of feature extractor 200. These different feature types are described in the following sections. The feature extractor 200 contains configuration settings to control the token extraction. For example, one setting is the length $T_L$ of the shingled token 52, 54 extracted from the data.

To extract features from HTML meta data, in a first step, all the attribute values for all the HTML "meta" tags are joined together to form a single content string 40, each attribute separated by a single space character. Characters are converted to lower case, and only alpha-numeric and space characters are added to the content string 40. Sequences of space characters are compressed to a single space character. For example, for the following two HTML "meta" tags:

"<meta property="fb:app_id" content="180444840287"/>"
"<meta name="DC.date.issued" content="2007-04-28">"

The following content string 40 is generated:
"fbappid 180444840287 dcdateissused 20070428"

Next, text content from the HTML "title" tag is extracted and appended to the previously calculated content string 40. Characters are converted to lower case, and only alpha-numeric and space characters are added to the content string 40. Sequences of space characters are compressed to a single space character. For example, for the following "title" tag:

"<title>Latest news, sport and comment from the Guardian|The Guardian </title>"

The following text is generated and appended to the content string 40:
"latest news sport and comment from the guardian the guardian"

Finally, text content from all anchors "a" tags is extracted and appended to the previously calculated content string 40. Characters are converted to lower case, and only alpha-numeric and space characters are added to the content string 40. Sequences of space characters are compressed to a single space character. The text content from the anchor "a" tag represents the text from the hyperlink which is displayed to a user in a web browser as a clickable link. For example, for the following two anchor "a" tags:

"<a href="#box" accesskey="s">Jump to content [s]</a>"
"<a href="#global-nav" accesskey="0">Jump to site navigation [0]<a>"

The following text string is generated and appended to the content string 40:
"jump to content s jump to site navigation 0"

In a final step, tokens 52, 54 are extracted from the complete content string 40 using the shingling method described previously, using a shingle length N=5 characters, for example.

To extract features from the uniform resource locator (URL) data, in a first step, all the attribute values for all the HTML anchor "a" tags are joined together to form a single content string 40, each attribute separated by a single space character. Characters are converted to lower case, and only alpha-numeric and space characters are added to the content string 40. For example, for the following two HTML anchor "a" tags:

"<a href="#box" accesskey="s">Jump to content [s]</a>"
"<a href="#global-nav" accesskey="0">Jump to site navigation [0]<a>"

The following content string 40 is generated:
"box s globalnav 0"

In a next step, the same procedure is applied to all the "link" tags. For the following link tag:
"<link rel="shortcut icon" href="/favicon.ico" type="image/x-icon"/>"

The following content is generated:
"shortcut icon faviconico image xicon"

In a final step, tokens 52, 54 are extracted from the complete content string 40 using the shingling method described previously, using a shingle length N=5 characters, for example.

To extract non-content structural features of the HTML data, in an initial step, the HTML-DOM tree is traversed, and each HTML tag node (head, body etc.) is converted to a numeric code in the range 0-255, for example, which represents this tag. The resulting codes are concatenated to form a sequence of tag codes, and this tag code sequence is shingled to form structural tokens. In this procedure, only the "begin" tags are used—no codes are used from the corresponding "end" tags (/head, /body etc.).

To perform the conversion, an array of all valid HTML tag names is created, and sorted alphabetically. The numeric code of a tag is then simply the position of the tag in the array. The first element in the array is the comment node (!--), and so this receives the value 0. Next follow the nodes "!doctype", "a", "abbr" which receive the numeric codes 1, 2 and 3 respectively, and so on until all tags are accounted for. As HTML tags can appear in upper or lower case in an HTML document 10, 20, the tag values are stored in lower case in the table. When a table lookup is performed (by simple binary search), the tag to be searched for is converted to lower case before the lookup is performed. If the searched for tag is not found in the lookup table, the tag receives a default code of 255.

The resulting structural tokens describe "sub-trees" of the HTML-DOM tree. As an example, the following HTML document (very short for the sake of illustration):

```
<html>
  <head>
    <title>Latest news, sport and comment from the Guardian | The Guardian</title>
    <meta property="fb:app_id" content="180444840287"/>
    <meta name="DC.date.issued" content="2007-04-28">
  </head>
  <body>
  <a href="#box" accesskey="s">Jump to content [s]</a>
  <a href="#global-nav" accesskey="0">Jump to site navigation [0]</a>
  <link rel="shortcut icon" href="/favicon.ico" type="image/x-icon"/>
  <ol>
    <li><a href="http://gu.com/science">Science</a></li>
    <li><a href="http://gu.com/football">Football</a></li>
  </ol>
  </body>
</html>
``` contains the following tags:
 "html head title meta meta body a a link of li a li a"
 Given that the tags have the follow codes:
 "htm1=44, head=42, title=86, meta=57, body=14, a=2, link=54, ol=61, li=53"
 The following tag code sequence is produced.
 "44 42 86 57 57 14 2 2 54 61 53 2 53 2"
 In a final step, tokens 52, 54 are extracted from the complete tag code sequence 40 using the shingling method described previously, using a shingle length N=10 tag codes, for example.

Referring to FIG. 4, each feature classifier 900 consists of a feature classifier module 910, a feature extractor 200, a feature database 400 and a parameter file 34. For a given HTML-DOM data input 22, the feature classifier module 910 extracts features from the HTML-DOM data 22 using the feature extractor 200, and looks these features up in the feature database 400. The probabilities of the found features are combined to form an overall feature probability value 920, a value between 0 and 1 which describes the likelihood that the HTML document 20 belongs to the genre as described by the tokens in the feature database 400.

The parameter file 34 contains values for parameters used in the calculation of the overall feature probability value 920. The parameters file 34 contains for example a value for $P_{DEF}$, a default probability for a feature not found in the database 400, values for $W_D$, $P_D$ and $V_{BIAS}$, used to calculate the probability value $P_F$ for each feature in the database 400, $NUM_F$, a number of features to take into consideration when calculating the overall feature probability 920, and MP, a mapping value used in the final step of calculating the overall feature probability 920.

The corresponding feature classifier 900 is initialized by reading the parameter file 34, and loading the feature database 400 into main memory. When the feature database 400 is loaded, the feature classifier module 910 calculates the probabilities for each feature in the database using the values $T_G$, $T_{NG}$, $C_G$, $C_{NG}$, stored in the database 400, and the values $W_D$, $P_D$ and $V_{BIAS}$, stored in the parameter file 34, in the manner described previously.

To calculate the overall feature probability 920 from the given HTML-DOM document 20, the following steps are carried out. As a first step, a set 210 of features is extracted from the HTML-DOM data 22 using the feature extractor 200, in the manner described previously. Next, the features are looked up in the feature database 400 using a binary search. If a feature is found, the feature probability, as previously calculated when loading the feature database 400, is added to a set of probabilities SP. If the feature is not found in the database 400, a value of $P_{DEF}$ is stored in SP. The set is ordered by descending order of interest value, where the interest value of probability P is defined as abs(0.5−P). If two tokens have the same interest value, the token with the lower probability (i.e., the token with a probability <0.5) is sorted before the token with the probability >0.5.

The first $NUM_F$ features from the set (based on the set sort order) are used to calculate the overall feature probability $F_P$ according to equations (5) to (9):

$$PROD_G = \text{product}(i=1 \ldots NUM_F, SP_i) \quad (5)$$

$$PROD_{NG} = \text{product}(i=1 \ldots NUM_F, 1-SP_i) \quad (6)$$

$$NG = \text{inverse chi square}(-2*\ln(PROD_G), 2*NUM_F) \quad (7)$$

$$G = \text{inverse chi square}(-2*\ln(PROD_{NG}), 2*NUM_F) \quad (8)$$

$$FP_{RAW} = (1+NG-G)/2 \quad (9)$$

This method of probability combination can be found in the literature on spam detection ("A Statistical Approach to the Spam Problem", Gary Robinson).

In a final step, the value FP is calculated from $FP_{RAW}$ using a linear mapping function with threshold MP according to equations (10) to (12), such that:

$$FP=0.5, \text{ if } FP_{RAW}=MP \quad (10)$$

$$FP=0.5+0.5*(FP_{RAW}-MP)/(1-MP), \text{ if } FP_{RAW} >= MP \quad (11)$$

$$FP=(FP_{RAW}/MP)*0.5, \text{ if } FP_{RAW} < MP \quad (12)$$

The value of MP will be different for each feature classifier 900, and can be set by manual inspection of the classification results for the feature classifier 900. It serves as a normalizing factor, so that each feature classifier 900 returns a probability >=0.5 for a positive result, i.e. the HTML document 20 belongs to the genre as described by the features in the feature database 400, and <0.5 for a negative result.

Referring to FIG. 3, the genre classifier 800 of the shown embodiment consists of a genre classifier module 810, one or more feature classifiers 900 and a parameter file 32. For a given HTML-DOM data input 22, the genre classification module 810 computes a genre probability 820, a likelihood that the HTML data 20 belongs to the given web genre of the genre classifier 800. The HTML-DOM data 22 is passed to each feature classifier 900, which analyses the data 22 and returns a feature probability 920.

The parameters file 32 contains values for parameters used in the calculation of the genre probability 820, for example the combination method used, or threshold values for each feature classifier 900. The genre classifier 800 is initialized by reading the parameters file 32, and initializing each feature classifier 900 used. The genre probability 820 is calculated from the individual feature probability values 920 using a specified combination function or algorithm. Examples of a function or algorithm could be: Maximum value of all feature probability values 920, or weighted average value of all feature probability values 920.

Referring to FIG. 2, the classification functionality 2 of the shown embodiment consists of the classification module 700, one or more genre classifiers 800, the HTML-DOM parser 300 and a parameters file 30. For a given HTML data input 20, the classification module 700 computes a genre classification result 710, consisting of one or mode genre identifications, together with a probability that the HTML data 20 belongs to the genre denoted by the genre identification. The parameter file 30 contains values for parameters used in the calculation of the genre classification result 710, for example a threshold value $G_{THRES}$ to determine which genre probabilities 820 to include in the final result 710. The classification functionality 2 is initialized by reading the parameters file 30, and initializing each genre classifier 800 used.

The classification module 700 first converts the HTML data 20 to HTML-DOM data 22 using the HTML-DOM parser 300 in the manner described previously. The HTML-DOM data 22 is then passed to each genre classifier 800, which analyses the data 22 and returns the genre probability 820. If the genre probability exceeds the threshold value $G_{THRES}$, the genre identification specified by the genre classifier 800 and the genre probability 820 are added to the genre classification result 710. The genre classification result 710 is sorted by genre probability 820, such that the genre with the highest genre probability 820 is ranked first in the genre classification result 710, for example.

Referring to FIG. 1, the training functionality 1 in the shown embodiment consists of the learning module 100, one or more feature extractors 200 and a HTML-DOM parser 300. The learning module 100 takes as input a corpus of HTML documents 10 which belong to a web genre also called first (genre) training material 500, and a corpus of HTML documents which do not belong to the web genre, also called second (non-genre) training material 600. The learning module 100 creates a number of feature databases 400, in the shown embodiment, one database 400 per feature extractor 200, in which are contained the extracted features from the HTML document corpora 500, 600, in the following manner. On initialization, the learning module 100 creates a number of initially empty feature databases 400 in main memory, one per feature extractor 200 in the shown embodiment.

For each file in the genre corpus 500 of HTML documents 10, the file is parsed by the HTML-DOM parser 300 to create an HTML-DOM document 22. The HTML-DOM data 22 is then passed to each feature extractor 200, which extracts a feature set 210 from the data 22. Each feature from the feature set 210 is added to the corresponding feature database 400, such that if the feature is not previously contained in the database 400, the feature receives a corresponding first count $C_G$ value of 1, and if the feature is already contained in the database 400 the corresponding first count $C_G$ for the feature is incremented by 1. For each file in the genre corpus 500, the third count $T_G$ is incremented by 1 for each database 400.

The files in the non-genre corpus 600 of HTML documents 10 are processed in the same manner, the only difference being that the second feature counts $C_{NG}$ and fourth file counts $T_{NG}$ in the databases 400 are modified.

Rare features are removed from each Feature Database based on one or more of the following criteria, for example: For every feature in a feature database 400, if $(C_G+C_{NG})<T_1$, remove the feature, or for every feature in a feature database 400, if $(C_G+C_{NG})/(T_G+T_{NG})<T_2$, remove the feature. Where $T_1$ and $T_2$ are parameters passed to the learning module 100 on initialization.

Finally, all feature databases 400 are saved to disk in binary format. The tokens, together with the corresponding values $C_G$ and $C_{NG}$ are stored in alphabetical order in the disk format, to facilitate a binary search lookup when the feature database 400 is loaded into main memory by a feature classifier 900.

Figure 9:
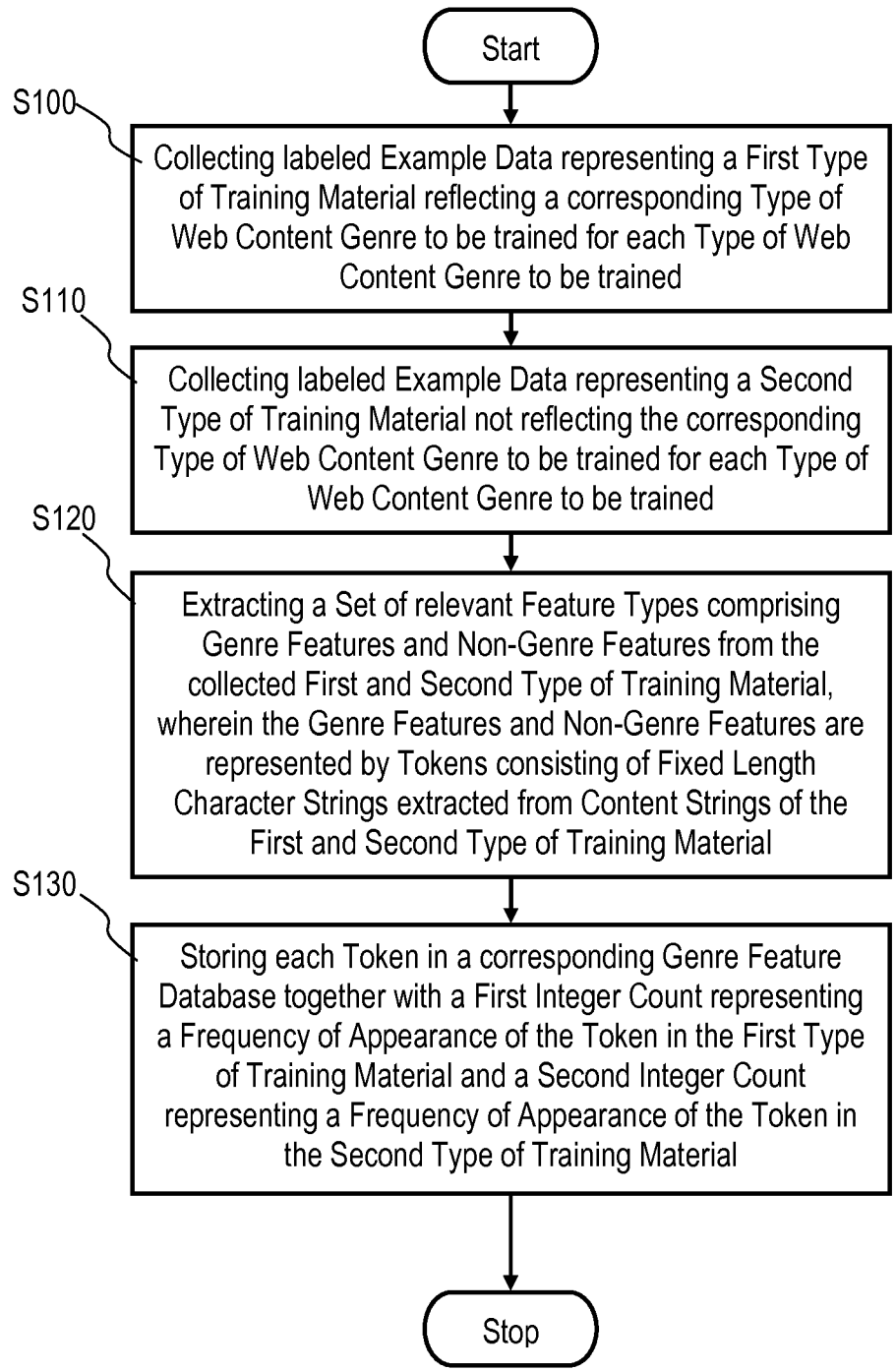
FIG. 9 is a flow diagram of a training process used in a method for automatic genre determination of web content, in accordance with an embodiment of the present invention.
Figure 10:
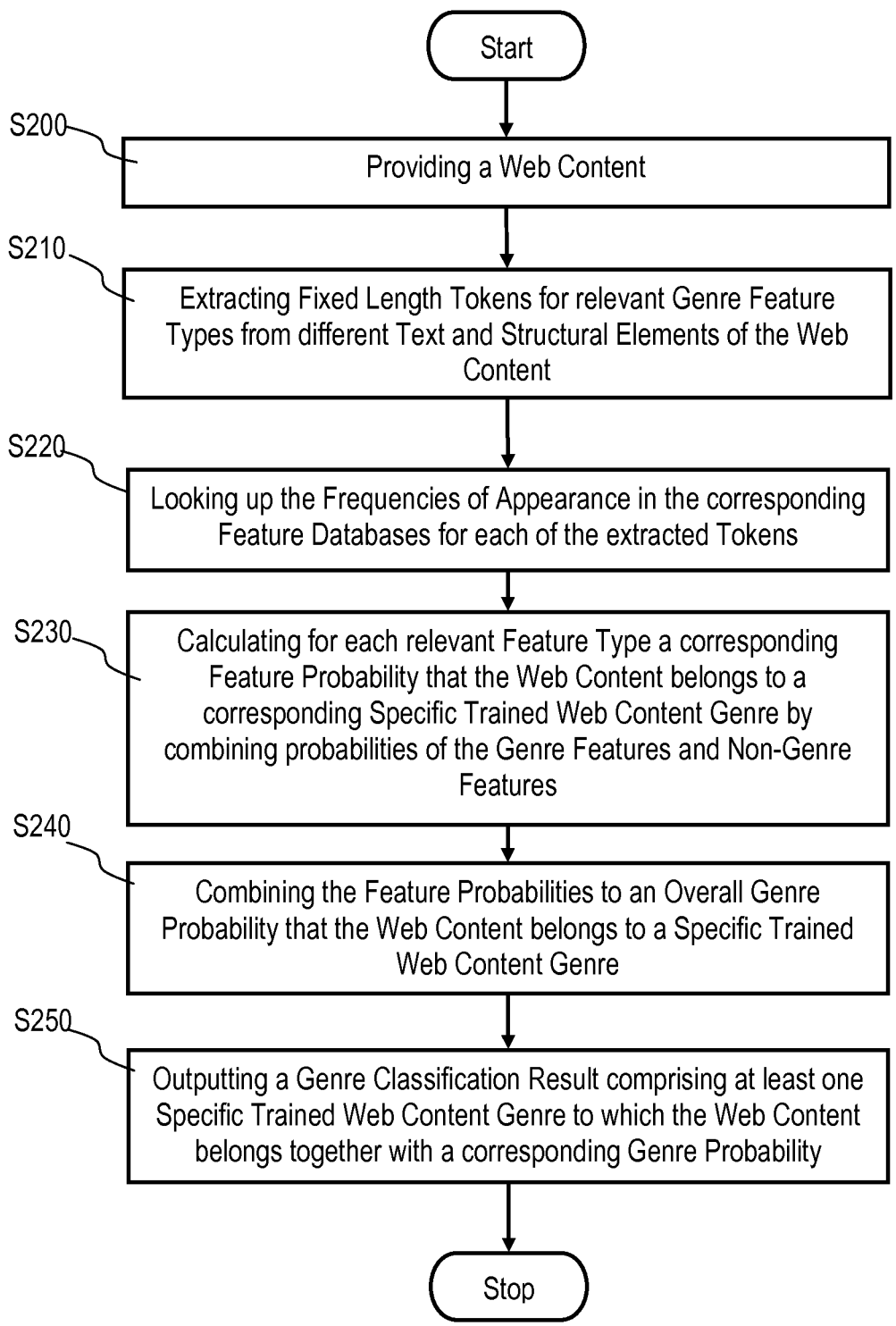
FIG. 10 is a flow diagram of a classification process used in the method for automatic genre determination of web content, in accordance with an embodiment of the present invention.

FIG. 9 shows a training process used in a method for automatic genre determination of web content 20, in accordance with an embodiment of the present invention; and FIG. 10 shows a classification process used in the method for automatic genre determination of web content 20, in accordance with an embodiment of the present invention. The method for automatic genre determination of web content 20 performs a training process and a classification process.

Referring to FIG. 9 for each type of web content genre to be trained the training process comprises the steps of: Collecting labeled example data 10 representing a first type of training material 500 reflecting the type of web content genre to be trained, in step S100. In step S110 labeled example data 10 representing a second type of training material 600 not reflecting the type of web content genre to be trained are collected. In step S120 a set 210 of relevant feature types comprising genre features and non-genre features from the collected first and second type of training material 500, 600 are extracted, wherein the genre features and the non-genre features are represented by tokens 52, 54 consisting of fixed length character strings extracted from content strings 40 of the first and second type of training material 500, 600. In step S130, each token 52, 54 is stored in a corresponding feature database 400 together with a first integer count $C_G$ representing a frequency of appearance of the token 52, 54 in the first type of training material 500 and a second integer count $C_{NG}$ representing a frequency of appearance of the token 52, 54 in the second type of training material 600. At least one of the following genres is trained as type of web content genre: Blog, forum, chat room, social media site, or internet discussion site.

Referring to FIG. 10, the classification process comprises the steps of: Providing web content 20 in a step S200. In step S210, fixed length tokens 52, 54 for relevant features types are extracted from different text and structural elements of the web content 20. In step S220, frequencies of appearance in the corresponding feature database 400 are looked up for each extracted token 52, 54. In step S230, for each relevant feature type a corresponding feature probability 920 that the web content 20 belongs to a corresponding specific trained web content genre is calculated by combining probabilities of the genre features and non-genre features. In step S240, the feature probabilities 920 are combined to an overall genre probability 820 that the web content 20 belongs to a specific trained web content genre. In step S250, a genre classification result 710 comprising at least one specific trained web content genre to which the web content 20 belongs together with a corresponding genre probability 820 is outputted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a hardware processor and a memory coupled to the hardware processor, the memory comprising instructions executed by the hardware processor to cause the hardware processor to implement a training process and a classification process for automatic genre determination of web content, the method comprising:

the training process, wherein for each of at least one type of web content genre to be trained in the training process, comprises the steps of:
collecting first labeled example data representing a first type of training material reflecting the type of web content genre to be trained;
collecting second labeled example data representing a second type of training material not reflecting the type of web content genre to be trained;
extracting a set of feature types comprising genre features and non-genre features from the collected first type of training material and second type of training material, wherein the genre features and the non-genre features are represented by tokens consisting of fixed length character strings extracted from content strings of the first and second type of training material; and
storing each token in a corresponding feature database together with a first integer count ($C_G$) representing a frequency of appearance of the token in the first type of training material and a second integer count ($C_{NG}$) representing a frequency of appearance of the token in the second type of training material; and the classification process, wherein the classification process comprises the steps of:
providing web content, wherein the web content is a HyperText Markup Language (HTML) document, which is parsed to generate HTML document object model (DOM) data providing a tree representation of the HTML document, where each tag, attribute and text data of the web content is represented as a node in the tree, wherein a first feature type is generated by joining together attribute values of all HTML meta data tags to form a single content string, wherein each attribute value is separated by a single space character, further text content from a HTML title tag and HTML anchor tags is extracted and appended to the content string, wherein characters are converted to lower case and only alpha-numeric and space characters are added to the content string and sequences of space characters are compressed to a single space character; wherein a second feature type is generated by joining together attribute values of all HTML anchor tags and all link tags to form a single content string, wherein each attribute value is separated by a single space character, and wherein characters are converted to lower case and only alpha-numeric and space characters are added to the content string and sequences of space characters are compressed to a single space character;
extracting fixed length tokens for each feature type of the set of feature types from different text and structural elements of the web content;
looking up frequencies of appearance in the corresponding feature database for each extracted token;
calculating for each feature type of the set of feature types a corresponding feature probability that the web content belongs to a corresponding specific trained web content genre by combining probabilities of the genre features and non-genre features;
combining the feature probabilities to an overall genre probability that the web content belongs to a specific trained web content genre; and
outputting a genre classification result comprising at least one specific trained web content genre to which the web content belongs together with a corresponding genre probability.

2. The method according to claim 1, wherein at least one of the following genres are trained as type of web content genre: blog, forum, chat room, social media site, or internet discussion site.

3. The method according to claim 1, wherein a set of tokens is extracted from a content string of the first and second type of training material or the web content by passing a fixed length sliding window over the content string forming the token from characters of the content string which lie within the fixed length sliding window, starting from a left-most character of the content string, wherein the fixed length sliding window is shifted by one character to the right until an end of the fixed length sliding window lies at a right-most character of the content string.

4. The method according to claim 1, wherein the first feature type denotes the fixed length tokens extracted from meta data contained in the first type of training material and second type of training material or the web content.

5. The method according to claim 1, wherein the second feature type denotes the fixed length tokens extracted from uniform resource locator (URL) data contained in the first type of training material and second type of training material or the web content.

6. The method according to claim 1, wherein a third feature type denotes the fixed length tokens extracted from structural information of the first type of training material and second type of training material or the web content, wherein the structural information comprises numeric codes in a defined range, each code word representing a tag node of web content structure.

7. The method according to claim 1, wherein a third feature type is generated by traversing the HTML document object model (DOM) tree and converting each HTML tag node to a numeric code in a range from 0 to 255 which represents this tag, wherein resulting codes are concatenated to form a sequence of tag codes, and this tag code sequence is used as content string to extract a set of tokens by passing the fixed length sliding window over the content string.

* * * * *